United States Patent [19]
Henderson et al.

[11] Patent Number: 5,440,337
[45] Date of Patent: Aug. 8, 1995

[54] MULTI-CAMERA CLOSED CIRCUIT TELEVISION SYSTEM FOR AIRCRAFT

[75] Inventors: Thomas D. Henderson; James M. McCann, both of San Marcos, Calif.

[73] Assignee: Puritan-Bennett Corporation, Carlsbad, Calif.

[21] Appl. No.: 152,350

[22] Filed: Nov. 12, 1993

[51] Int. Cl.[6] .............................................. H04N 7/18
[52] U.S. Cl. .................................... 348/144; 348/159
[58] Field of Search ............................. 348/144, 159; H04N 7/18

[56] References Cited

PUBLICATIONS

Preliminary Technical Description Landscape Camera System for Wide Body Aircraft, prepared by Airborne CCTV, Dec. 19, 1991.

*Primary Examiner*—Howard W. Britton
*Attorney, Agent, or Firm*—Fulwider Patton Lee & Utecht

[57] ABSTRACT

The invention is a compact multi-camera closed circuit video television system for use in commercial aircraft. The arrangement of the cameras and the construction of the system are arranged to allow installation within either the pressurized or unpressurized portions of the aircraft, and the video cameras are arranged to provide multiple views of the exterior of the aircraft under the control of the flight crew.

1 Claim, 3 Drawing Sheets

U.S. Patent     Aug. 8, 1995     Sheet 1 of 3     5,440,337
FIG. 1
PRIOR ART
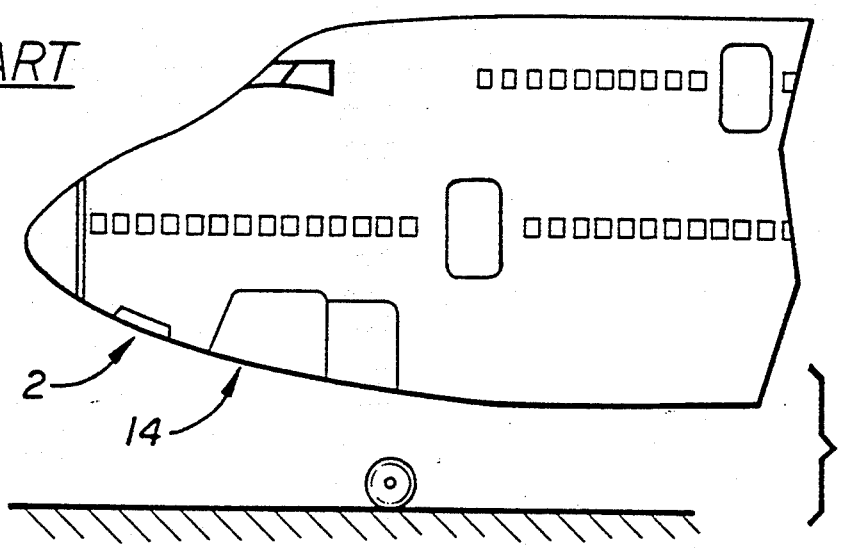
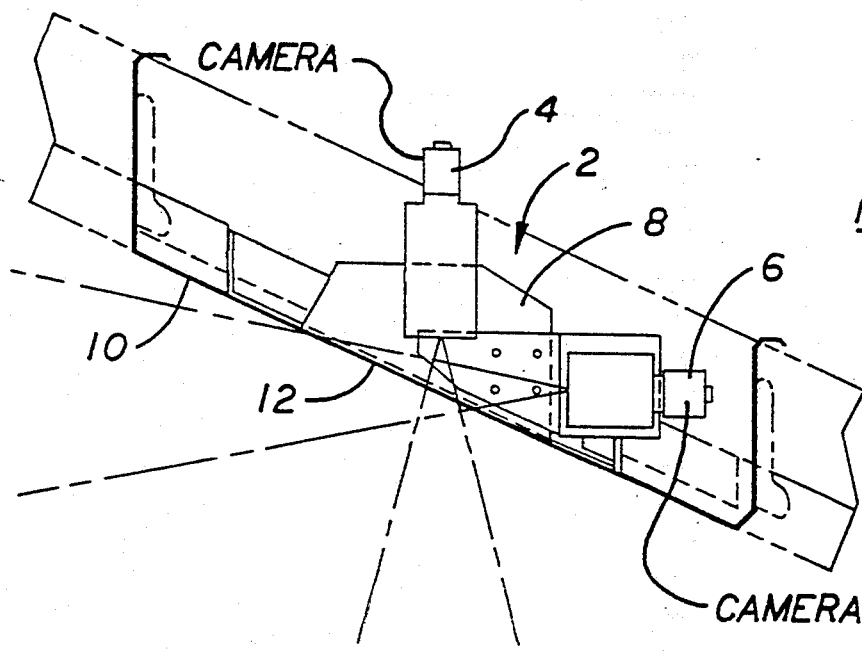
FIG. 2
PRIOR ART
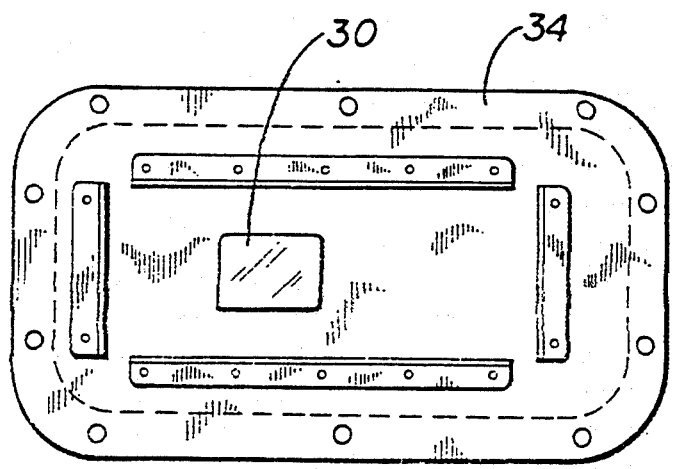
FIG. 6

MULTI-CAMERA CLOSED CIRCUIT TELEVISION SYSTEM FOR AIRCRAFT

BACKGROUND OF THE INVENTION

1. Field of the Invention

This invention relates to television camera systems utilized in commercial aircraft, and more particularly to a multi-camera closed circuit television system used to provide video to existing passenger entertainment video systems in order to provide views of the environment outside of the aircraft.

2. Description of Related Art

The advent of on board television in commercial aircraft for entertainment purposes has provided the focus for a variety of entertainment options for the passengers. In addition to the ordinary availability of motion pictures, other alternatives such as news programs, videos and the like have been made available to the passenger for their viewing via selection from a variety of channels representing different video sources. Furthermore, on board video systems have been utilized to provide the passengers with important safety and emergency information as an adjunct to the normal pre-flight briefings provided by the flight attendants. In recent times, the use of on-board video displays has gone increasingly from a projection type television to individual viewing screens for the passengers, thus opening up the possibility of selection by the passenger from among a great number of possible entertainment sources. One additional source for such entertainment is a view of the outside environment through which the aircraft is flying.

The first use of such cameras in a commercial setting was on board wide body aircraft in approximately the 1980 time frame. Such systems included a camera mounted in the cockpit and provided the passengers with a view of the take-off and landing more or less over the captain's shoulder. This scenario produced two issues which eventually led to the removal of the cameras from the flight deck. The first problem arose because the camera was mounted on the aft wall looking forward through the cockpit window, and this scheme resulted in the camera looking from the low ambient light condition through a window into either a very high ambient light condition, or virtual darkness. The auto iris function of the cameras used was not capable of handling this wide dynamic lighting range, and as a result the camera provided images that blossomed the video signal past useable level. Another problem was, since the camera field of view included most crew activities within the cockpit, the flight crews looked upon such exposure as undesirable; the surveillance also created an area of possible liability for the company in the event that activities occurred within the cockpit which resulted in some safety of flight issue.

In a later prior art system, an exterior viewing television camera has been mounted aboard commercial aircraft, utilizing a fairly large window cut in the fuselage skin forward of the nose wheel on 747 type aircraft. The television cameras were mounted behind the window by means of structural modifications that provided shelving for the camera head units and the associated camera control units. Warm air was ducted into the area to provide defogging of the window during ascent and descent, and to keep the camera head and associated electronics ambient temperatures at a normal operating level. This provision was required for proper operation, since the units were installed in an unpressurized portion of the fuselage. Such a system had a number of operational problems. For instance, the mechanical installation provided access only through the nose wheel well, which resulted in high maintenance man-hour requirements in the event of any problems with the cameras. Also, the cameras were exposed to cycling through relatively low and high pressure as the aircraft climbed from sea level pressures to operating pressures at the flight levels. Thus, this type of system included a number of operational disadvantages which severely limited the uses of the system, both due to operational limitations and cost of maintenance. The present invention provides at least two sources of high quality video of the external environment of the aircraft while eliminating or substantially limiting the problems outlined above.

SUMMARY OF THE INVENTION

The present invention is embodied in a compact, sealed, multi-camera closed circuit television unit which may be installed within the pressurized or unpressurized lower forward portion of the aircraft. The novel arrangement of the system, which includes two closed circuit television cameras with associated zoom lenses viewing through a very small heated window, substantially enhances the maintainability, reliability and picture quality of the system. The invention utilizes two solid state interline transfer charge coupled device (CCD) focal plane television cameras co-located within a single compact housing which forms a sealed unit against moisture and pressure differentials. This camera module unit (CMU) is arranged so that when the CMU is installed in the lower forward nose section of an aircraft, the first camera field of view is downward or perpendicular to the horizontal line of flight in order to provide a landscape field of view, and the lens for this purpose is a zoom telephoto of approximately six times power. The second camera field of view is forward and approximately coincident with the line of flight. This camera may be equipped with a fixed field of view lens, or a zoom lens.

The television cameras employed in the system are two-unit cameras in which the first unit is a camera head unit (CHU) which embodies the optics, CCD focal plane sensor and the interface electronics for the CCD drive electronics housed in the camera control unit. The camera control unit (CCU) is a separate unit which houses the CCD drive circuitry video synchronization, video processing and power supplies, with a CCU being provided for each CHU. The CMU houses the two CHU's via a mechanical structure which provides the optical window for the camera fields of view. The optical window is heated to prevent camera fogging any time during operation. The CHU body itself and the attached lens systems are heated by means of surface mounted heater assemblies. The CMU is mounted to the aircraft structure by means of doublers, clips and intercostals and is accessible from the exterior of the aircraft for maintenance purposes, thus eliminating the problems associated with maintenance of the prior art systems. The invention also includes a system control unit (SCU) which is located in the cabin of the aircraft where it is accessible to a cabin crew member. The unit provides control functions for the system, such as switching between the forward and downward looking cameras and a lens zoom control unit. Controls for the camera focus and display selection are also provided.

The arrangement of the present invention provides significant advantages over prior art systems. For instance, the module concept provides easy access for maintenance crews, thereby significantly reducing the man-hours required by camera replacement or other maintenance of the camera associated subassemblies. The novel and compact arrangement of the cameras within the unit of the subject invention significantly reduces the window size required for both the wide angle and narrow angle fields of view, thereby improving the damage resistance of the window, simplifying system installation and enhancing overall system reliability and ease of installation in a variety of aircraft. The small size of the window and the compact size of the entire system was made possible by the novel arrangement of the cameras relative to one another, which was only discovered after considerable experimentation. This internal camera arrangement also substantially reduces the total size of the system, thus making it possible to mount the system within a pressurized portion of the fuselage without significant structural change and still allow for easy and rapid removal of the system for maintenance.

The electrical heating of certain components of the CMU, namely the window of the CHU body and the camera lens assemblies, eliminates the requirements for ducted, heated air in the camera location for operational reliability and fogging abatement. This further simplifies the installation of the system within the aircraft by locating the most thermal sensitive components in the CCU and relocating this unit into the electronic equipment bay, thus providing an ambient temperature for these components well within specified limitations, thereby reducing component thermal stress. In addition, the highest failure rate components are located within the CCU. Thus, locating this unit in the electronics bay provides easy and rapid access of the CCU for maintenance and replacement. While the present invention was developed to be advantageously utilized in the pressurized portions of a commercial aircraft and provide unique benefits thereby, those skilled in the art will recognize that many of the benefits of the invention such as compact dimensions, ease of installation and ease of maintenance may also be utilized if the invention is used in non-pressurized portions of the aircraft.

The camera module unit contains two high-resolution CCD color television cameras. One camera looks forward while the other camera looks down. The forward camera is outfitted with a 16 mm auto-iris lens. The downward looking camera is outfitted with a 8.5-51 mm (6×) remote controlled zoom lens. As an option, the forward looking camera is available with a zoom lens. Both cameras are contained in a hermetically sealed package and view the outside world through an electronically heated optical-grade window. The package is installed in the lower area of the nose section of the aircraft between the radome and the nose landing gear wheel well. Actual location depends on aircraft type, but for the 747-400 aircraft the location is Station 190 at BL 0. The design of the camera module unit provides for ease of installation and removal in any wide body aircraft type.

The camera control unit is an ARINC 600 rack-mounted line-replaceable-unit (LRU) which contains all the necessary electronics for the system. The camera control unit receives signals from the system control unit for camera selection and zoom/focus control. The camera control unit also interfaces to the aircraft to monitor the landing gear door status. When the landing gear door is open the forward camera is automatically activated to provide a view of taxi, takeoff and landing. Once the gear door closes, the downward camera is selected. However, both camera signals are continuously available which can be used as video programming for multi-channel seat-back individual video systems. The systems can be deactivated from the flight deck at any time and there is an output to illuminate a "Camera-in-Use" indicator as well. The CCU can also be configured to interface directly to all popular camera-control equipped video system control units and cabin management systems.

To summarize, some advantages of the subject invention over prior art systems include; 1) the module or aspect of the invention provides easy access for maintenance crews, thereby significantly reducing the man-hours required for camera replacement; 2) the subject invention significantly reduces the window size required for both wide angle (down looking) and narrow angle fields of view, thereby increasing the damage tolerance of the system installation and overall system reliability; 3) the heated components of the CMU, namely the window, the CHU body and lens, negate the requirement for ducting heated air into the camera location; 4) the most thermal sensitive system components are located in the CCU. Relocating this unit into the electronics bay provides a constant ambient temperature well within specified component limitations, thereby reducing component thermal stress. Additionally, the highest failure rate components are located within the CCU; relocating this unit to the electronics bay provides easy and rapid access to the CCU for LRU replacement.

From the above, it is evident that the present invention provides an improved exterior view television camera for use with commercial aircraft, as an input to entertainment video systems. This system substantially enhances reliability, maintainability and quality of the video output compared to prior art systems. Other features and advantages of the present invention will become apparent from the following detailed description taken in conjunction with the accompanying drawings which illustrate, by way of example, the principals of the invention.

BRIEF DESCRIPTION OF THE DRAWINGS

FIG. 1 is an illustration in plan form of the location of prior art exterior view camera systems in wide body commercial aircraft.

FIG. 2 is a cross section view of a prior art camera system suitable for installation in the lower forward area of a wide body aircraft.

FIG. 6 is a bottom view of the cover plate of the camera module unit of the present invention, illustrating the arrangement of the window in the unit.

DETAILED DESCRIPTION OF THE PREFERRED EMBODIMENT

Figure 3:
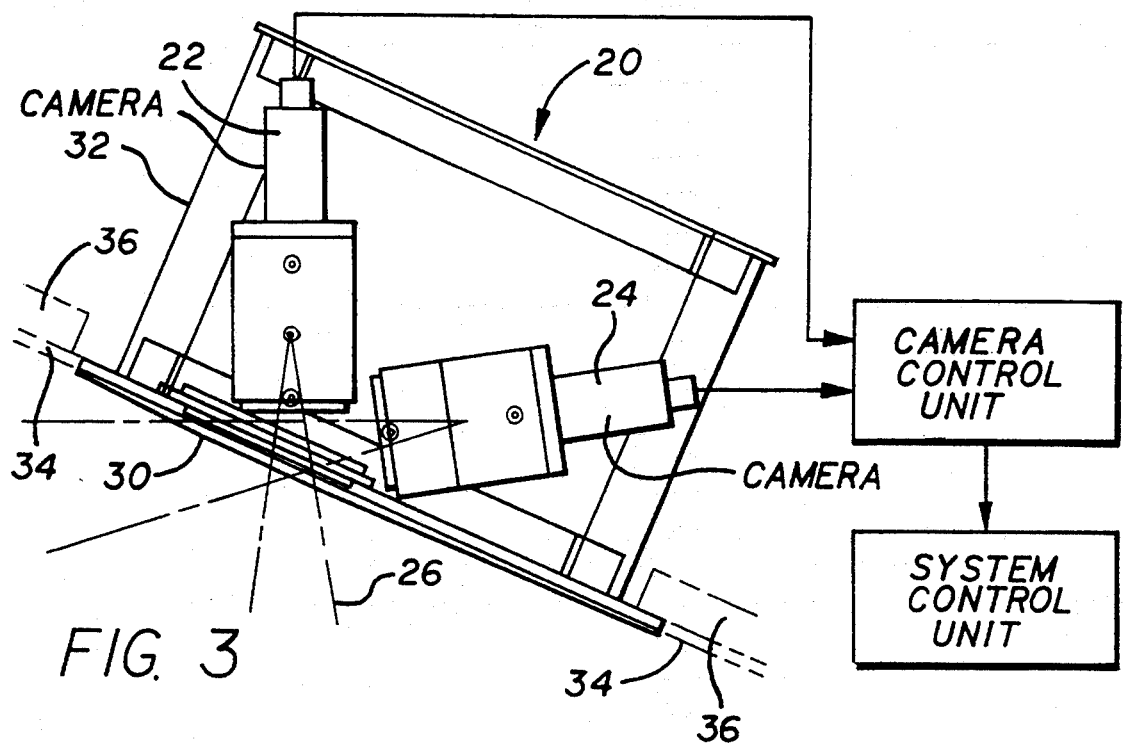
FIG. 3 is a cross sectional schematic view of the camera system of the present invention, illustrating the relationship of the major components.

The present invention is a multiple camera system for installation in commercial aircraft, providing exterior views of the aircraft for purposes of entertainment of the passengers. More specifically, the invention is embodied in a compact sealed unit incorporating at least two cameras which are arranged to give both a vertical (landscape) and a longitudinal (forward looking) view from the aircraft. The cameras are arranged closely adjacent one another so that their respective fields of view narrowly avoid the structure of the adjacent camera, providing a minimum envelope for installation in the aircraft. In order to further facilitate installation in the aircraft, the system is contained in a small sealed enclosure which incorporates the camera focal plane and optics with the external signal conditioning and drive mechanisms located remotely in an electronics equipment bay. The robustness and flexibility of the system are enhanced by the arrangement of the cameras, which allows for a minimum sized window, thereby limiting the cost and maintenance of the optical aperture. The entire system may be sealed, thus substantially improving the ability to install the camera module unit both within pressurized and unpressurized portions of an aircraft. In order to improve the flexibility of the installation, critical elements of the camera module unit, including the camera optics and the optical window, are heated to control the environment and avoid fogging. A system control unit, which can actuate the lens systems and control the video outputs, is located remotely at a crew station so that operation of the system by the crew is easily accomplished.

Some prior art systems have provided exterior view of aircraft for entertainment purposes. One such system, included installation in a forward bay of a wide body aircraft as illustrated in FIG. 1. Such a camera unit 2, illustrated in more detail in FIG. 2, included a pair of cameras 4, 6 arranged to view both vertically and longitudinally from within the housing 8 located within the structure 10 of a forward portion of the aircraft. Such systems were located in unpressurized portions of the aircraft and the installation included relatively large windows 12 through which the cameras viewed the surroundings of the aircraft. In order to avoid fogging and other environmental concerns associated with the unpressurized environment and the range of altitudes and environments in which such aircraft typically operate, provision was made for the ducting of heated air into the compartment in order to defrost the window and maintain an acceptable operating temperature for the electronic components. Since such a system was located forward of the landing gear compartment 14, maintenance and access were primarily achieved through the landing gear well after the aircraft had landed, and maintenance was difficult and time consuming.

Figure 4:
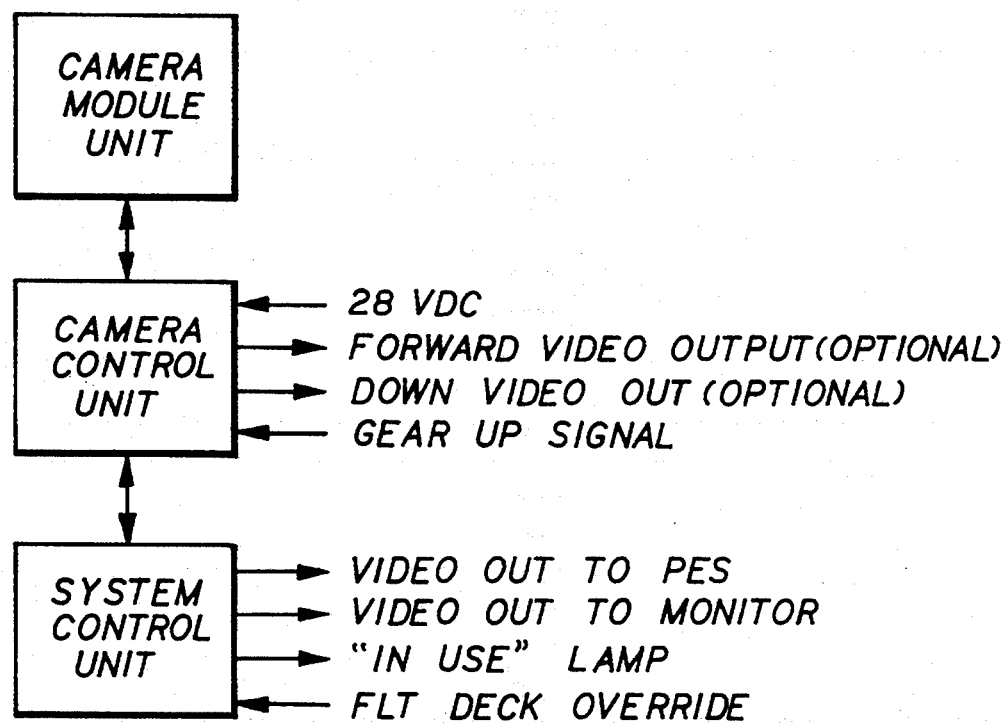
FIG. 4 is a block diagram of the major electronic components of the present invention.

The present invention is embodied in a compact multiple camera unit 20 as illustrated in FIG. 3 in which the cameras 22, 24 are located so that their respective fields of view 26, 28 narrowly avoid the structure of the adjacent camera. By utilizing this arrangement, the cameras may utilize a field of view from a substantially reduced window 30 compared to that of prior art cameras. More specifically, as illustrated in FIG. 3, the vertical viewing camera 22 is forward projection of the envelope of the horizontally viewing camera 24, but avoids the field of view 28 of the forward looking camera in order to minimize the size of the window 30 required. In one presently preferred embodiment, the window required is only 1.9" by 2.9", the entire unit incorporating the camera focal planes and optics is contained in a sealed camera module unit (CMU) 32 which provides an environment in which the cameras may be isolated from outside environmental influences. The entire camera module unit is easily removed or replaced within the structure 34 without access being required through the forward landing gear well. As illustrated in FIG. 3, the camera module unit may be bolted in from an exterior location and fits within the structural longitudinal stringers in this portion of the aircraft. Referring to FIG. 4, which illustrates the general relationship of the major subassemblies of the invention, the primary electronics associated with signal conditioning and control of the cameras, as well as a video conditioning for the output, is contained in a camera control unit (CCU) which may be mounted in an electronic equipment bay within the aircraft and remotely located from the CMU. The CCU in turn may be controlled by a system control unit (SCU) readily accessible to a member of the flight crew in order to control the video input to the in-flight entertainment system.

Figure 5:
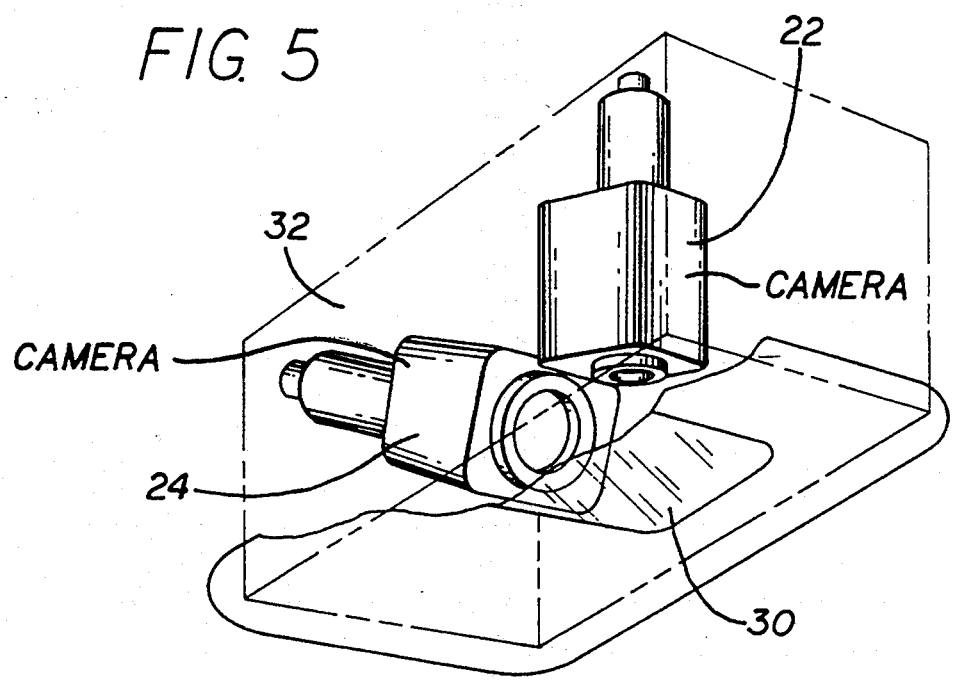
FIG. 5 is a perspective of the arrangement of cameras in the present invention.

FIG. 5 illustrates a perspective view of the camera module unit 32 of the present invention, showing the relatively small window 30 through which the two cameras are viewing the exterior environment in the present system. As shown in this view, the vertical looking camera 22 falls within the forward projected envelope of the longitudinal viewing camera 24 and narrowly avoids the field of view of the zoom lens in the longitudinal camera. This arrangement provides important benefits in minimizing the size of the optical window 30 required and also limiting the size of the camera module unit 32, thus making the system more easily adaptable to a variety of aircraft and is easily incorporated within a pressurized portion of the aircraft without a requirement for additional structural reinforcement. FIG. 6 is a view looking from inside the camera module unit towards the exterior of the aircraft, illustrating the size of the window 30 compared to the overall size of the camera module unit bottom cover plate 34.

Figure 7:
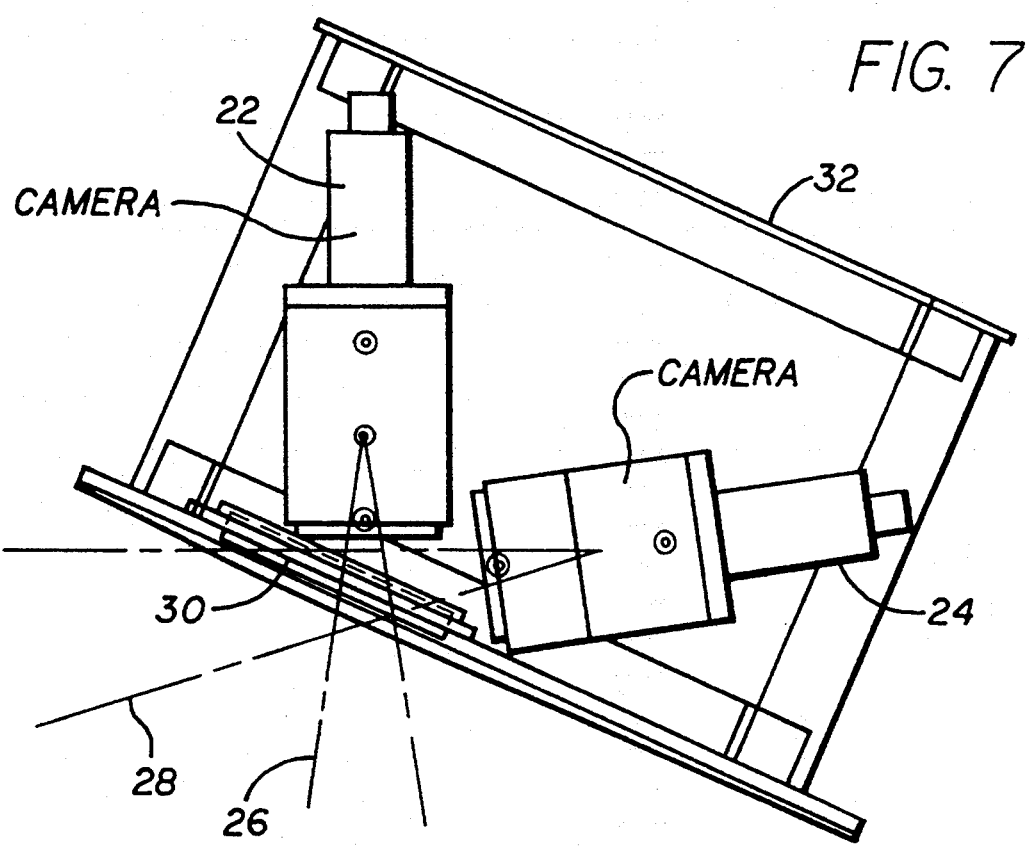
FIG. 7 is a cross sectional view of the camera module unit of the present invention, illustrating the relationship of the cameras and optics to the window in the unit.

FIG. 7 is a cross sectional view of the camera module unit 32 of the present invention, illustrating the close relationship of the two cameras 22, 24 and their respective fields of view 26, 28 and the small window 30 thereby required in order to provide exterior views of the aircraft. As may be seen from this drawing, the camera arrangement of the present invention is substantially more compact than that of prior art arrangements and this results in important benefits associated with the size of the window and the ability to place the camera module unit within the severe structural constraints associated with after market installation of the camera module unit in modern pressurized high speed aircraft.

Camera Module Unit (CMU)

Referring again to FIGS. 3 and 5-7, the CMU embodies the optics, video sensors, and a means to provide fields of view external to the aircraft. The development of the CMU was driven by three factors: 1) the footprint of the structural mounting of the CMU in the fuselage skin must be minimal size in order to maintain the damage tolerant design of the aircraft, and to standardize installation requirements for various aircraft types and models relative to nose section loft lines, frame spacing, and stringer locations, 2) the window in the base plate of the CMU must be minimal size in order to obtain high fault tolerance relative to pressurization and support the damage tolerance requirements of the aircraft, and 3) the minimal window dimensions then require modified optics in order to provide unobscured fields of view for both cameras.

The CMU is a sealed housing that provides a controlled temperature and moisture operating environment for the CCD camera head unit. In a present preferred embodiment, the solid state Interline Transfer Silicon CCD television camera employed in the system is a two piece camera model number 8280 or 8380 PAL manufactured by COHU Inc. The camera head unit (CHU) embodies the optics, CCD sensor, and the interface electronics for the CCD drive circuitry. The second component of the camera is a remotely mounted camera control unit (CCU) which houses the CCD drive circuitry, video processing electronics, synchronization circuitry, and power supplies. Together these two components comprise a single television camera. In the presently preferred embodiment, two of these cameras are required for the system.

The two camera head units (CHUs), inclusive of their lens assemblies, are located within the CMU and secured by means of machined bracket assemblies; these bracket assemblies provide rotational and elevation adjustments for the camera head unit fields of view. Correct lateral alignment of the CMU and thereby the camera head units is accomplished during the installation process. The CMU is structurally integrated into the aircraft fuselage skin and employs a 2.9 inch × 1.9 inch optical grade heated window in its base plate through which the two CHU's provide fields of view external to the aircraft.

The cameras are arranged within the CMU so that when the module is installed in the nose section of an aircraft, one camera field of view is downward or perpendicular to the horizontal line of flight; this camera is equipped with a telephoto zoom lens with a minimum focal length of 8.5 mm and 6× zoom. In a presently preferred embodiment, a COSM ICAR 8-48 f1.4 auto-iris zoom lens model HS6ZME is used for this purpose. The second camera field of view is forward or coincidental to the line of flight and is typically equipped with a fixed field of view lens. The optics of the forward looking camera may be a fixed focal length of no less than 16 mm and as an option may be a variable focal length (zoom) lens assembly; in either event, the presently used forward looking camera optics require a 2× adapter, in order to provide a field of view unrestricted by the minimum window size of the downward looking camera hardware.

The optical window 30 is heated to prevent window fogging at any time during operation. The CHU body itself and its attached lens assembly are heated by means of surface mounted heater assemblies. The CMU is mounted into the aircraft structure by means of doublers, clips, and intercostals and is accessible from the exterior of the aircraft for maintenance purposes.

Camera Control Unit (CCU).

The CCU of the subject invention combines two CCU's into a common unit, or simply, a dual CCU. This dual CCU is mounted in the aircraft in the equipment bay which is typically aft of the nose wheel well. The camera control unit houses the CCD drive circuitry, video processing electronics, synchronization circuitry, power supplies and video distribution amplifiers. As illustrated in FIG. 4, the CCU is connected to the CHU by a multi-conductor electrical cable assembly fabricated of twisted-shielded pairs, shielded singles, coaxial cable, and unshielded single wires. These wiring components are encased together in a shielded assembly. A cable similar to the CMU-CCU cable assembly is utilized to interconnect the CCU and the SCU.

System Control Unit (SCU)

The third component in the subject system is the system control unit (SCU) illustrated schematically in FIG. 4. This unit is located in the cabin of the airplane where it is accessible to a cabin crew member. This unit provides all the control functions for the system such as: switching between the forward and downward looking cameras and lens zoom in and out. Controls for camera focus and display selection are also provided. As an option, a small LCD screen is mounted in the SCU to provide the operator with an image of the selected field of view.

From the above, it may be seen that the present invention provides substantial improvements in camera module units which were designed for installation in a variety of large body aircraft, particularly those in which the camera module unit is to be located in a pressurized section of the aircraft. The present invention also provides for important improvements in maintainability and reliability due to the placement of components of the system in areas of the aircraft which provide easy access and benign environments within the specifications for the components. Since the system is intended to be utilized in a wide variety of aircraft in operating environments, these features make possible an economic and reliable component which may be effectively utilized in a commercial aircraft operating environment.

While a particular form has been illustrated and described, it will be apparent that various modifications can be made without departing from the spirit and scope of the invention. Accordingly, it is not intended that the invention be limited except as by the appended claims.

What is claimed is:

1. An airborne closed circuit television system which comprises a first camera, said first camera equipped with a zoom lens, said first camera arranged to have a field of view essentially perpendicular downward from the aircraft's centerline, said first camera including said zoom lens and other associated optics, a focal plane sensor and an interface electronics unit to condition the output of the focal plane electronics for transmission to an external camera control unit;

a second camera arranged essentially parallel to the aircraft's center line and forward facing, said second camera also incorporating camera lens optics, a focal plane sensor and interface electronics;

a camera module unit structure which houses the two cameras in relation to one another, the system arranged to provide fields of view which narrowly avoid imaging the adjacent camera;

a window mounted within said camera module unit providing a field of view of the cameras, said window provided with means to heat said window;

means to heat at least one component of said cameras;

a remote camera control unit containing electronics to drive and process information from the camera; and a remote control unit in the flight deck of the aircraft which allows control of the functional aspects of the system by a member of the flight crew.

* * * * *